United States Patent [19]

Watanabe et al.

[11] Patent Number: 6,074,729
[45] Date of Patent: *Jun. 13, 2000

[54] PRESSURE-SENSITIVE ADHESIVE SHEET

[75] Inventors: Shunpei Watanabe; Takashi Suzuki; Shuuichiro Ikeda, all of Saitama-ken, Japan

[73] Assignee: Lintec Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,703

[22] Filed: Jul. 10, 1996

[30] Foreign Application Priority Data

Jul. 14, 1995 [JP] Japan .................................. 7-201565

[51] Int. Cl.$^7$ ........................................................ C09J 7/02
[52] U.S. Cl. ........................... 428/212; 428/214; 428/354; 428/355; 428/355 AC; 428/355 BL
[58] Field of Search ..................................... 428/354, 355, 428/212, 214, 355 AC, 355 BL

[56] References Cited

U.S. PATENT DOCUMENTS

| | | | |
|---|---|---|---|
| 3,032,438 | 5/1962 | Gaynes | 427/208.8 |
| 3,161,533 | 12/1964 | Gaynes | 366/2 |
| 3,812,005 | 5/1974 | Katagiri | 156/334 |
| 4,112,177 | 9/1978 | Salditt | 428/354 |
| 4,260,659 | 4/1981 | Gobran | 428/354 |

*Primary Examiner*—Jenna Davis
*Attorney, Agent, or Firm*—Brinks Hofer Gilson & Lione; G. Peter Nichols

[57] ABSTRACT

A pressure-sensitive adhesive sheet 1A is for use by sticking onto a liquid crystal cell, and it has a construction wherein the pressure-sensitive adhesive layer 3 is joined to one side of the base material layer 2 which is constructed with a light-polarizing sheet and a release sheet 4 stuck onto the other side from the base material layer 2 of the pressure-sensitive adhesive layer 3. The pressure-sensitive adhesive layer 3 is constructed as a laminate with the layers 31 and 32. An acrylic-based pressure-sensitive adhesive, for example, can be used for the pressure-sensitive adhesives from which the layers 31 and 32 are constructed, but the shear elastic modulus or the relaxation elastic modulus of the layer 32 is set lower than that of the layer 31 as a result of a difference in the composition of the pressure-sensitive adhesive, the degree of crosslinking or the amount of plasticizer added in the layers 1 and 32. The stress which is produced by contraction, for example, of the base material layer is relieved and stress concentration can be reduced. In particular, white marking and color unevenness of the liquid crystal cell can be suppressed.

33 Claims, 2 Drawing Sheets

PRESSURE-SENSITIVE ADHESIVE SHEET

BACKGROUND OF THE INVENTION

1. Field of the Invention

This invention relates to a pressure-sensitive adhesive sheet which is to be stuck onto an adherend, and in particular relates to a pressure-sensitive adhesive sheet which forms optical parts, such as light-polarizing sheets for example, which are used by being stuck onto the liquid crystal cell of a liquid crystal display.

2. Description of the Prior Art

Light-polarizing sheets can be used by being stuck onto the liquid crystal cells of liquid crystal display devices (LCD). A pressure-sensitive adhesive layer is formed on one surface of the light-polarizing sheet for sticking to another optical part such as a liquid crystal cell for example (hereinafter, such optical parts are typified by "a liquid crystal cell", and a release sheet is stuck onto this pressure-sensitive adhesive layer. Furthermore, a protective sheet (protective film) constructed with a protective sheet base material and a pressure-sensitive adhesive layer is stuck onto the other surface of light polarizing sheet which is opposite to the pressure-sensitive adhesive layer in order to protect the other surface of the light-polarizing sheet.

In this case, the light-polarizing sheet is used by peeling off the release sheet, sticking the exposed pressure-sensitive adhesive layer to a liquid crystal cell and then peeling off the protective sheet.

A base material of the light-polarizing sheet used on a liquid crystal cell generally has a triple-layer structure with a PVA based polarizer sandwiched between two TAC (triacetylcellulose)-based protective films. However, because of the characteristics of these materials, the base material of the light-polarizing sheet has poor dimensional stability. In particular, the base material is likely to experience a pronounced change in dimensions due to contraction caused in high temperature or high temperature and high humidity environments.

Hence, when such a light-polarizing sheet having the base material is stuck onto a liquid crystal cell with a pressure-sensitive adhesive, defects such as air bubbles generated within the pressure-sensitive adhesive layer, lifting of the pressure-sensitive adhesive layer and peeling off and the like are liable to occur.

In the past, the two-liquid crosslinking-type pressure-sensitive adhesives which have a high pressure-sensitive adhesive strength and a high shear strength have been used as the pressure-sensitive adhesive which forms the pressure-sensitive adhesive layer in order to prevent these problems from arising. By using a pressure-sensitive adhesive of this type, it has been possible to provide improvement in respect of the problems such as the lifting and peeling which are caused by contraction of the base material of the light-polarizing sheet. On the other hand, however, since the contractile stress of the base material of the light-polarizing sheet cannot be absorbed and alleviated by the pressure-sensitive adhesive, the distribution of the residual stress in the base material of the light-polarizing sheet becomes uneven. In particular, stress is likely to be concentrated in the outer peripheral portion of the base material of the light-polarizing sheet. As a result, there is a problem in that so called "white marking" is liable to appear with TN (TFT) liquid crystal cells and color unevenness is liable to appear with STN liquid crystal cells. Here, it should be noted that "white marking" means a phenomenon that a black non-transparent portion of a liquid crystal cell becomes partially transparent due to uneven contraction of a base material of a light-polarizing sheet attached to the liquid crystal cell.

SUMMARY OF THE INVENTION

In view of the problems described above, the present invention has been made. Accordingly, an object of this invention is to provide a pressure-sensitive adhesive sheet which can relieve the stress which is produced by the contraction of the base material layer and with which stress concentration is minimized, and in particular to provide a pressure-sensitive adhesive sheet with which the white marking and color unevenness of liquid crystal cells can be suppressed.

In order to achieve the above-mentioned object, the present invention is directed to a pressure-sensitive adhesive sheet which comprises a base material layer; and a pressure-sensitive adhesive layer which is constructed with a laminate of a plurality of layers which include a first layer which is closest to the base material layer and a second layer, wherein the shear elastic modulus of the second layer is lower than the shear elastic modulus of the first layer.

In this case, it is preferred that the ratio of the shear elastic modulus of the second layer with respect to the shear elastic modulus of the first layer is from 5 to 99%.

Further, it is preferred that the pressure-sensitive adhesive composition in the first layer and the pressure-sensitive adhesive composition in the second layer are different.

Further, it is also preferred that the base material layer and the first layer are tightly bonded, and the first layer has a shear elastic modulus of such an extent that neither cohesive failure nor boundary surface failure occur due to the result of the action of the shear stress which accompanies contraction of the base material layer.

Furthermore, it is also preferred that the first layer and the second layer are tightly bonded, and the bonding strength thereof is of an extent which slightly exceeds the bonding strength on the adherend of the pressure-sensitive adhesive layer.

Furthermore, it is also preferred that the thickness of the second layer is of the order of from 0.5 to 15 times the thickness of the first layer.

Moreover, it is also preferred that the pressure-sensitive adhesive layer is formed by means of a lamination method with transfer.

Moreover, it is also preferred that the base material layer is a sheet-like optical part.

Another aspect of the present invention is directed to a pressure-sensitive adhesive sheet which comprises a base material layer; and a pressure-sensitive adhesive layer which is constructed with a laminate of a plurality of layers which include a first layer which is closest to the base material layer and a second layer, wherein the relaxation elastic modulus of the second layer is lower than the relaxation elastic modulus of the first layer.

In this case, it is preferred that the ratio of the relaxation elastic modulus of the second layer with respect to the relaxation elastic modulus of the first layer is from 1 to 99%.

Further, it is also preferred that the relaxation elastic modulus G(100) after 100 seconds of the first layer is from $2.0 \times 10^5$ to $5.0 \times 10^6 [dyn/cm^2]$ and the relaxation elastic modulus G(100) after 100 seconds of the second layer is from $7.0 \times 10^4$ to $2.0 \times 10^6 [dyn/cm^2]$.

The other aspect of the present invention is directed to a pressure-sensitive adhesive sheet which comprises a base material layer; and a pressure-sensitive adhesive layer which is constructed with a laminate of a plurality of layers which include a first layer which is closest to the base material layer and a second layer, wherein the amount of plasticizer added to the composition material of the second layer is large when compared with the first layer.

In this case, it is preferred that the amount of plasticizer added to the composition material of the second layer is from 0.1 to 50 parts by weight per 100 parts by weight of the adhesive composition.

Other aspect of the present invention is directed to a pressure-sensitive adhesive sheet which comprises a base material layer; and a pressure-sensitive adhesive layer which is constructed with a laminate of a plurality of layers which include a first layer which is closest to the aforementioned base material layer and a second layer, wherein the degree of crosslinking of the polymeric material from which the second layer is constructed is low in comparison with the degree of crosslinking of the polymeric material from which the first layer is constructed.

According to the pressure-sensitive adhesive sheet according to the present invention as described above, no lifting or peeling will occur of the pressure-sensitive adhesive layer with respect to the base material layer, the stress which is produce by contraction of the base material layer is relieved by the pressure-sensitive adhesive layer and the local stress concentration at the edges of the sheet can be reduced.

Consequently, this invention has the effect of suppressing the phenomena which are produced by the stress distribution in the base material layer becoming uneven, such as the white marking with TN (TFT) liquid crystal cells and the color unevenness with STN liquid crystal cells.

Furthermore, with the pressure-sensitive adhesive sheets of this invention the pressure-sensitive adhesive layer can be manufactured with a lamination method by transfer or by co-extrusion, and production thereof can be made simple.

Other objects, structures and advantages of the present invention will be apparent when the following detailed description of the preferred embodiments will be considered taken in conjunction with the accompanying drawings.

DETAILED DESCRIPTION OF THE PREFERRED EMBODIMENTS

Hereinafter, preferred embodiments of a pressure-sensitive adhesive sheet according to the present invention will be described with reference to the appended drawings.

Figure 1:
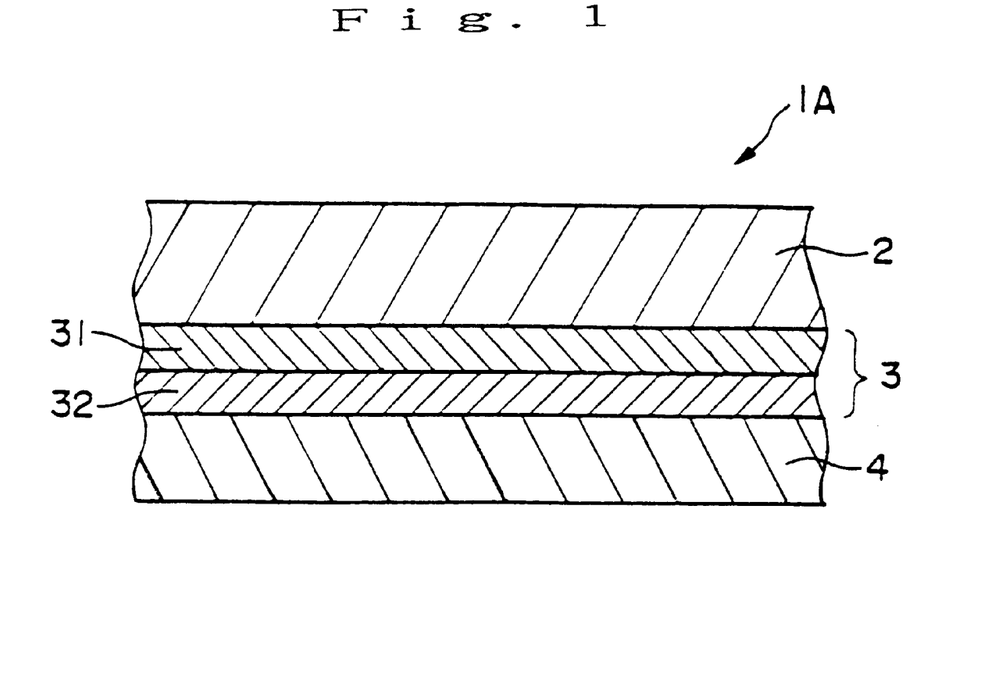
FIG. 1 is a cross-sectional view which shows a first embodiment of a pressure-sensitive adhesive sheet according to the present invention.

FIG. 1 is a cross-sectional view which shows a first embodiment of a pressure-sensitive adhesive sheet according to the present invention, in which the pressure-sensitive adhesive sheet is used as a light-polarizing sheet which is to be stuck to a liquid crystal cell. As shown in the drawing, the adhesive sheet 1A of the invention is mainly used for sticking onto a TN (TFT) liquid crystal cell. The pressure-sensitive adhesive sheet is constructed from a base material layer 2, a pressure-sensitive adhesive layer 3 having one side which is joined to the base material layer 2 and the other side opposite to the one side, a release sheet 4 which is stuck to the other side of the pressure-sensitive adhesive layer 3.

The base material layer 2 in this embodiment is formed into a light-polarizing sheet (sheet-like optical part), and it has a triple layer construction which, for example, includes the PVA-based polarizer inserted between two triacetylcellulose films.

The base material layer 2 itself has low dimensional stability with respect to changes in the environmental conditions, and in particular it has a nature such that it contracts and thereby the dimensions become smaller when it is subjected to high temperature, or high temperature/high humidity conditions.

The pressure-sensitive adhesive layer 3 is constructed as a laminate body in which a plurality of layers 31 and 32 are laminated. Hereinbelow, the common features of the layers 31 and 32 will be described.

As for the materials for the pressure-sensitive adhesive (pressure-sensitive adhesive composition) from which each of the layers 31 and 32 is constructed, any of rubber-based pressure-sensitive adhesives, acrylic-based pressure-sensitive adhesives and silicone-based pressure-sensitive adhesives and the like can be used. Among these adhesives, it is particularly preferred that the acrylic-based pressure-sensitive adhesives are used as its main composition.

The acrylic-based pressure-sensitive adhesives are formed of polymers or copolymers in which a main monomer component of low Tg which provides the adhesive properties, a comonomer component of high Tg which imparts adhesive properties and cohesive strength, and a functional group containing monomer for crosslinking and improving the adhesive properties are contained as main components.

As for examples of the main monomer component, alkyl esters of acrylic acid such as ethyl acrylate, butyl acrylate, amyl acrylate, 2-ethylhexyl acrylate, octyl acrylate, cyclohexyl acrylate and benzyl acrylate and the like, and alkyl esters of methacrylic acid such as butyl methacrylate, 2-ethylhexyl methacrylate, cyclohexyl methacrylate and benzyl methacrylate and the like can be cited.

As for examples of the comonomer components, methyl acrylate, methyl methacrylate, ethyl methacrylate, vinyl acetate, styrene and acrylonitrile and the like can be cited.

As for examples of the functional groups containing monomer components, carboxylic acid group-containing monomers such as acrylic acid, methacrylic acid, maleic acid and itaconic acid, hydroxyl group-containing monomers such as 2-hydroxyethyl (meth) acrylate, 2-hydroxypropyl (meth) acrylate and N-methylolacrylamide, acrylamide, methacrylamide, grycydylamide and the like can be cited.

The reasons why the materials mentioned above are preferred are because they have excellent adhesive strength and cohesive strength. Further, these materials are very stable in respect of light and oxygen since there are no unsaturated bonding in the polymer. Furthermore, it is possible to obtain any qualities and properties which are suitable for a particular application by selecting the types of monomer and their molecular weights appropriately.

As for examples of the rubber-based pressure-sensitive adhesives, natural rubber-based, isoprene rubber-based, styrene-butadiene-based, regenerated rubber-based and polyisobutylene-based materials can be cited. Further, block copolymers which contain rubber such as styrene-isoprenestyrene and styrene-butadiene-styrene systems can also be cited.

As for examples of the silicone-based pressure-sensitive adhesives, dimethylsiloxane and diphenylsiloxane-based materials can be cited.

The pressure-sensitive adhesives such as those described above can be used in the form of crosslinking and non-crosslinking types. In the case of a crosslinking type, various crosslinking agents such as epoxy-based compounds, isocyanate-based compounds, metal chelate compounds, metal alkoxides, metal salts, amine compounds, hydrazine compounds and aldehyde-based compounds and the like are used for crosslinking. Further, the method involving irradiation with radioactive beams can also be used. These methods can be selected appropriately in accordance with the type of functional groups for example.

Moreover, the pressure-sensitive adhesives of this type are preferably those which have a property that transmits light (and especially those which are substantially transparent or semi-transparent).

Plasticizers can be added, as required, to the pressure-sensitive adhesives of this type. As for examples of such plasticizers, esters such as phthalic acid esters, trimellitic acid esters, pyromellitic acid esters, adipic acid esters, sebacic acid esters, phosphate esters and glycol esters and the like, process oil, liquid polyethers, liquid polyterpenes and other liquid resins can be cited. In this case, just one of these, or a mixture of two or more types, can be selectively used.

As for the plasticizers, it is preferred that they have good compatibility or mutual solubility with the pressure-sensitive adhesive and have properties that can transmit light (especially those which are substantially transparent or semi-transparent).

Further, in addition to the plasticizers, various additives such as ultraviolet absorbers and anti-ageing agents, for example, can be added, as required, to the pressure-sensitive adhesive.

In this regard, the conditions including the type of pressure-sensitive adhesive and additives, the composition thereof, and the amounts added may be the same or different in the layer 31 and the layer 32.

Hereinbelow, the differences between the layer 31 (first layer) which is bonded to the base material layer 2 and the layer 32 (second layer) which is positioned away from the base material layer 2 will be described. In this regard, it is to be noted that the layer 31 and the layer 32 satisfy at least one of the conditions indicated under [1] to [5] below.

[1] CONDITION 1

The shear elastic modulus of the layer 32 is lower than the shear elastic modulus of the layer 31. With this result, even if any contraction or expansion (hereinafter, "contraction" means "contraction or expansion" of the base material layer 2 occurs, the layer 31 can maintain its bonding strength with the base material layer 2, and thereby lifting or peeling is effectively prevented. Further, at the same time, the layer 32 having a relatively low shear elastic modulus relieves (absorbs or disperses) the stress which has been produced by the contraction of the base material layer 2, so that local concentration of the residual stress can be prevented.

In this case, the shear elastic modulus of the layer 31 is preferably of an extent such that neither cohesive failure nor boundary surface failure occur as a result of the shear stress which is produced by the contraction, for example, of the base material layer 2. In this embodiment, the shear elastic modulus is preferably set in the order of from $4.0 \times 10^5$ to $9.0 \times 10^6$ [dyn/cm$^2$], and more desirably set in the order of from $5.0 \times 10^5$ to $8.0 \times 10^6$ [dyn/cm$^2$].

The ratio of the shear elastic modulus of the layer 32 with respect to the shear elastic modulus of the layer 31 is preferably from 5 to 99%, and most desirably from 10 to 90%. If this ratio exceeds 99%, then the realization of the abovementioned effect due to the difference in the shear elastic modulus is inadequate. On the other hand, if it is less than 5%, then the shear elastic modulus of the layer 32 is inadequate and there is a risk of cohesive failure occurring.

[2] CONDITION 2

The relaxation elastic modulus of the layer 32 is lower than the relaxation elastic modulus of the layer 31. With this result, even if any contraction of the base material layer 2 occurs, the layer 31 can maintain its bonding strength with the base material layer 2, and thereby lifting or peeling is effectively prevented. Further, at the same time, the layer 32 having a relatively low relaxation elastic modulus relieves (absorbs or disperses) the stress which has been produced by the contraction of the base material layer 2, so that local concentration of the residual stress can be prevented.

In this case, the relaxation elastic modulus is represented with the value G(t) in the formula of $\sigma(t)=G(t) \gamma o$. Here, "t" represents a time elapsed from the application of a fixed strain γo, and "σ(t)" represents the stress at that time. Further, "σ(t)" is considered to be proportional to "γo". In the invention "t" is taken to be 100 seconds.

The ratio of the relaxation elastic modulus of the layer 32 with respect to the relaxation elastic modulus of the layer 31 is preferably from 1 to 99%, and most desirably from 10 to 90%. If this ratio exceeds 99%, then the realization of the above-mentioned effect due to the difference in the shear elastic modulus is inadequate. On the other hand, if it is less than 1%, then the shear elastic modulus of the layer 32 is inadequate and there is a risk of cohesive failure occurring.

The respective values of the relaxation elastic module of the layer 31 and the layer 32 are preferably set as indicated below. Namely, the relaxation elastic modulus G(100) after 100 seconds of the layer 31 is preferably from $2.0 \times 10^5$ to $5.0 \times 10^6$ [dyn/cm$^2$], and most desirably from $3.0 \times 10^5$ to $4.0 \times 10^6$ [dyn/cm$^2$]. Moreover, the relaxation elastic modulus G(100) after 100 seconds of the layer 32 is preferably from $7.0 \times 10^4$ to $2.0 \times 10^6$ [dyn/cm$^2$], and most desirably from $8.0 \times 10^4$ to $1.0 \times 10^6$ [dyn/cm$^2$]. In these ranges, the above-mentioned effects can be realized more effectively.

[3] CONDITION 3

In a case where a plasticizer of the type described above is added to the composition material of the layer 32, the amount added is larger in comparison with the amount of plasticizer added (including cases where none is added) to the composition material of the layer 31. With this result, even if any contraction of the base material layer 2 occurs, the layer 31 can maintain its bonding strength with the base material layer 2, and thereby lifting or peeling is prevented. Further, at the same time, the layer 32 having a relatively higher flexibility than that of the layer 31 relieves (absorbs or disperses) the stress which has been produced by the contraction of the base material layer 2, so that local concentration of the residual stress can be prevented.

The amount of plasticizer added to the structural material of the layer 32 differs according to various conditions such as the type and composition of the pressure-sensitive adhesive (the adhesive composition), and no particular limitation is imposed, but generally an amount of from 0.1 to 50 parts by weight per 100 parts by weight of pressure-sensitive adhesive (adhesive composition) is preferred, and an amount of from 1.0 to 30 parts by weight is especially preferred. If the amount added is less than 0.1 part by weight, then the softening of the layer 32 by the addition of the plasticizer is inadequate and stress relief is difficult. On the other hand, if the amount exceeds 50 parts by weight, then this may invoke a worsening of the properties, such as cohesive failure for example, depending on the type and composition of the pressure-sensitive adhesive.

[4] CONDITION 4

The degree of crosslinking (degree of polymerization) of the polymeric material from which the layer 32 is constructed is low when compared with the degree of crosslinking (degree of polymerization) of the polymeric material from which the layer 31 is constructed. With this result, even if any contraction of the base material layer 2 occurs, the layer 31 can maintain its bonding strength with the base material layer 2, and thereby lifting or peeling is effectively prevented. Further, at the same time, the layer 32 having a relatively higher flexibility than that of the layer 31 relieves (absorbs or disperses) the stress which has been produced by the contraction of the base material layer 2, so that local concentration of the residual stress can be prevented.

The degrees of crosslinking of the polymeric materials from which the layers 31 and 32 are constructed differ according to various conditions, such as the type and composition of the pressure-sensitive adhesive (the adhesive composition), and no particular limitation is imposed, but generally the degree of crosslinking of the layer 31 is preferably, as a sol-gel fraction, from 10 to 95%, and most preferably from 15 to 90%, and the degree of crosslinking of the layer 32 is preferably, as a sol-gel fraction, from 5 to 90%, and most preferably from 10 to 85%. In these ranges, the above-mentioned effects can be realized more effectively.

[5] CONDITION 5

The type and composition of the pressure-sensitive adhesives from which the layers 31 and 32 are constructed differ from each other and, as a result, at least one of the conditions [1] to [2] indicated above is satisfied.

If any one of the conditions [1] to [5] described above is satisfied, the stress distribution in the base material layer 2 becomes more uniform as a result of the stress-relieving action of the pressure-sensitive adhesive layer 3. As a result, when the pressure-sensitive adhesive sheet is used by being stuck onto a TN (TFT) liquid crystal cell, the occurrence of white marking caused by variations in the transmittance is prevented or suppressed.

Moreover, in this embodiment, the contraction rate which accompanies the stress relaxation of the adhesive sheet 1A is preferably not more than 5.0%, and most preferably of the order of from 0.1 to 4.5%.

The general coating methods, and especially the lamination method with transfer, can be cited as ideal methods for the formation of the pressure-sensitive adhesive layer 3 comprising a laminate body of the layers 31 and 32. In a case where a pressure-sensitive adhesive layer 3 which has stress-relieving properties in accordance with the present invention is formed, the bonding between the layers 31 and 32 need not always be strong, and rather the bonding strength should be a little in excess of the bonding strength with respect to the adherend. If the bonding strength between the layers 31 and 32 is weak, peeling off (movement) at the boundary surface of the layer 31 and the layer 32 is liable to occur when a contraction of the base material layer 2 occurs, and thereby a stress-relieving action is also demonstrated. Therefore, such a weak bonding strength is desirable. For these reasons, the lamination method with transfer can be employed for the formation of the pressure-sensitive adhesive layer 3.

The coating liquids used in the coating methods as typified by the lamination method with transfer may be organic solvent-based or emulsion-based, and they may also be aqueous solution type pressure-sensitive adhesives.

Further, as for other method of forming the pressure-sensitive adhesive layer 3, the co-extrusion method (multi-layer extrusion molding) can be cited. According to this method, a plurality of layers can be formed at the same time.

No particular limitation is imposed upon the total thickness (dry film thickness) of the pressure-sensitive adhesive layer 3, but in a case where it is used in an application such as this embodiment, a total film thickness of 3 to 300 μm is preferable, a total film thickness of from 5 to 100 μm is more preferable and a total film thickness of from 10 to 60 μm is most preferable.

Furthermore, no particular limitation is imposed upon the thickness of the layer 31 or the layer 32, but it is preferred that a thickness of the layer 32 (second layer) is in the range of from 0.5 to 15 times the thickness of the layer 31 (first layer), and it is more preferable that a thickness of the layer 32 is in the range of from 1 to 10 times the thickness of the layer 31. The above-mentioned effects are realized more effectively with such a range.

The boundary surface between the layer 31 and the layer 32 need not always be distinct, and the composition and the conditions [1] to [5] described above may change continuously in the vicinity of the boundary surface.

Any types of release sheets can be used for the release sheet 4 which is stuck onto such a pressure-sensitive adhesive layer. For example, it is possible to use release sheets which have a base material formed from a film which is formed of various resins such as polyethylene terephthalate, polybutylene terephthalate, polycarbonate or polyarylate or the like. In such a base material, a release type coated layer (a silicone layer) (not shown in the drawings) is formed on the contact surface thereof which is to be attached to the pressure-sensitive adhesive layer 3.

Furthermore, although not shown in the drawings, a protective sheet (protective film) may be stuck onto the surface (the surface on the opposite side to the pressure-sensitive adhesive layer 3) of the base material layer 2.

Figure 2:
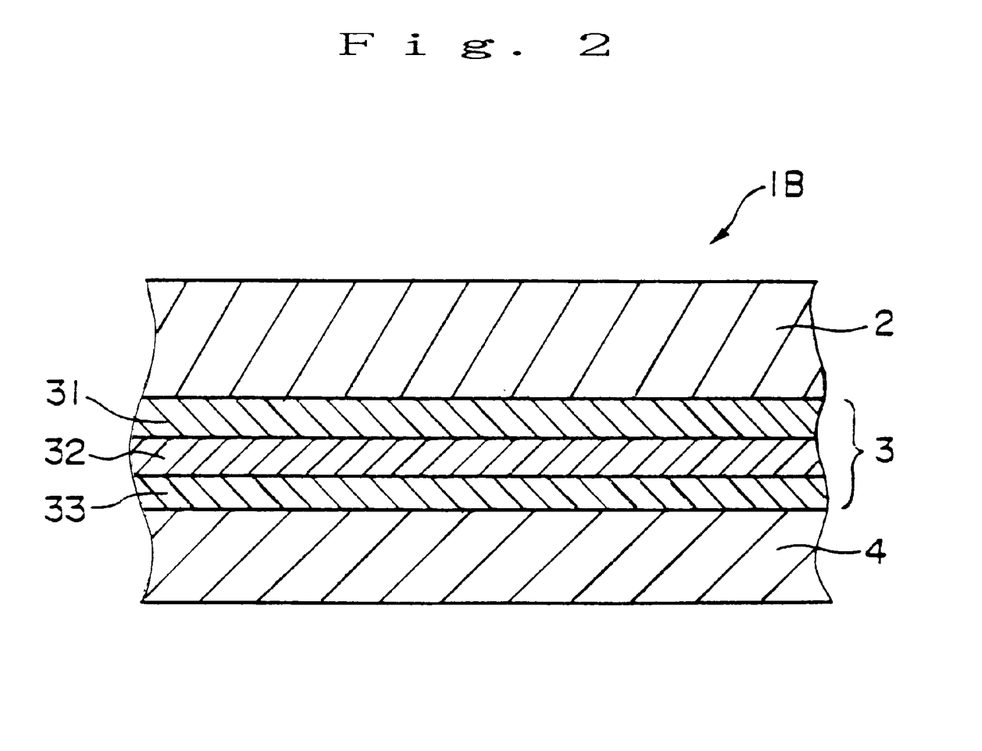
FIG. 2 is a cross-sectional view which shows a second embodiment of a pressure-sensitive adhesive sheet according to the present invention.

FIG. 2 is a cross-sectional view which shows a second embodiment of the pre sent invention, in which a pressure-sensitive adhesive sheet of this invention is used as a light-polarizing sheet which is to be stuck onto a liquid crystal cell. The pressure-sensitive adhesive sheet 1B shown in the drawing is one which is mainly used for sticking onto TN (TFT) liquid crystal cells, and it is the same as the aforementioned pressure-sensitive adhesive sheet 1A except that the layered structure of the pressure-sensitive adhesive layer 3 is different.

The pressure-sensitive adhesive layer 3 of the pressure-sensitive adhesive sheet 1B is constructed with a laminate body comprising the layer 31, the layer 32 and the layer 33. The factors which are common to the layers 31 to 33 are the same as those of the first embodiment.

Further, the layer 31 (first layer) which is bonded to the base material layer 2 and the intermediate layer 32 (second layer) satisfy at least one of the aforementioned conditions

[1] to [5], or the layer 31 (first layer) and the layer 33 (second layer) which is furthest from the base material layer 2 satisfy at least one of the aforementioned conditions [1] to [5].

In this connection, in the former case, no limitation is imposed upon the conditions relating to the remaining layer 33, and it may have the same condition as either one of the layers 31 or 32, or it may have a condition different from both the layers 31 and 32. Furthermore, in the latter case, no limitation is also imposed upon the conditions relating to the remaining layer 32, and it may have the same condition as either one of the layers 31 or 33, or it may have a condition different from both the layers 31 and 33.

With such a pressure-sensitive adhesive sheet 1B which has a pressure-sensitive adhesive layer 3 constructed in this way, the layer 31 retains its bonding strength with the base material layer 2 even if any contraction of the base material layer 2 occurs, and thereby lifting and peeling are effectively prevented. Further, at the same time, the layer 32 and/or the layer 33 relieves (absorbs or disperses) the stress which is produced as the base material layer 2 contracts, and therefore local concentration of the residual stress can be prevented. Furthermore, as has been described above, if the bonding strength between the layers 31, 32 and 33 is relatively weak, displacement (movement) at the boundary surfaces between adjoining layers occurs readily and a stress-relieving action caused by the displacement is also exhibited. Hence, in a case where the pressure-sensitive adhesive sheet 1B is used by being stuck onto a TN (TFT) liquid crystal cell, for example, the occurrence of white marking which is caused by changes in transmittance is prevented or suppressed.

Moreover, the ideal methods of forming the pressure-sensitive adhesive layer 3 on the pressure-sensitive adhesive sheet 1B are the same as those of the first embodiment.

Figure 3:
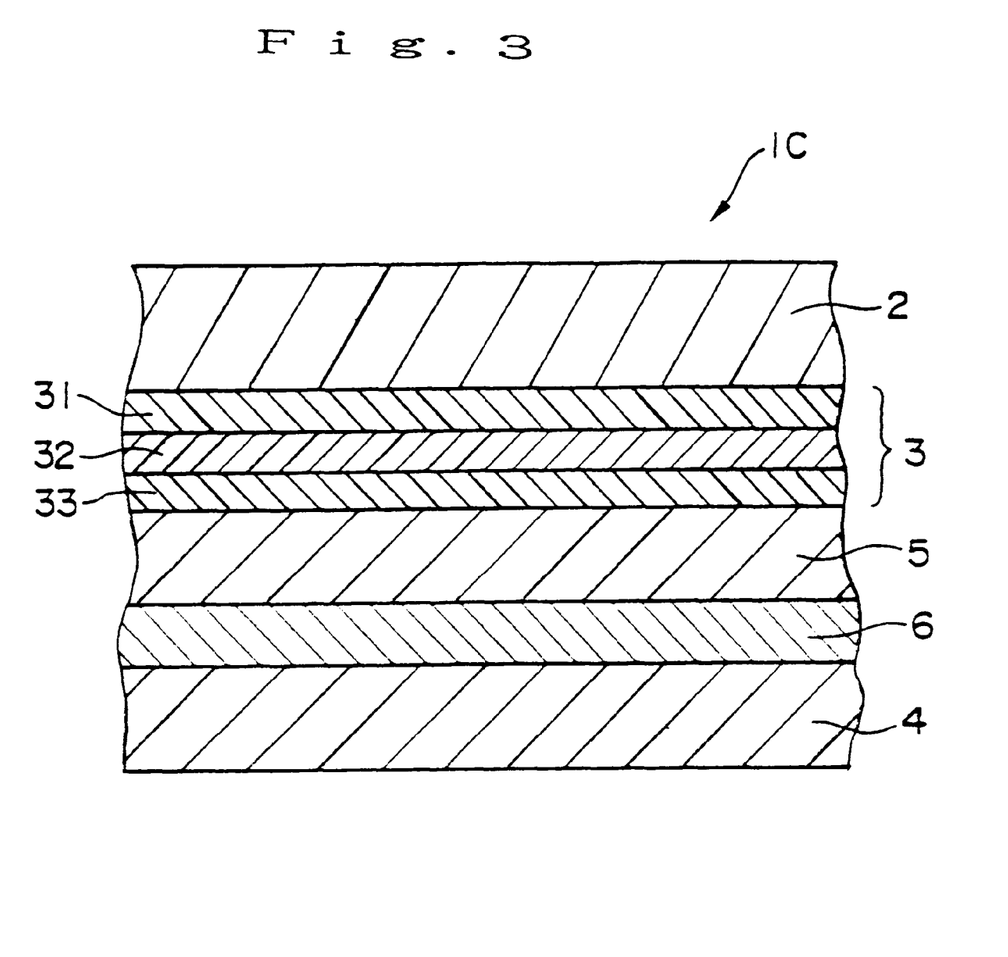
FIG. 3 is a cross-sectional view which shows a third embodiment of a pressure-sensitive adhesive sheet according to the present invention.

FIG. 3 is a cross-sectional view which shows a third embodiment of the present invention, in which an adhesive sheet of this invention is used as a light-polarizing sheet which is stuck onto a liquid crystal cell. The adhesive sheet 1C shown in the drawing is used mainly for sticking onto an STN liquid crystal cell. The structure of the pressure-sensitive adhesive sheet 1C is the same as that of the pressure-sensitive adhesive sheet 1B excepting that a phase difference sheet 5 and a pressure-sensitive adhesive layer 6 (second pressure-sensitive adhesive layer) are provided between the pressure-sensitive adhesive layer 3 and the release sheet 4.

The pressure-sensitive adhesive sheet 1C forms a light-polarizing sheet with which elliptically polarized light is obtained as a whole due to the provision of the phase difference sheet 5. The phase difference sheet 5 is joined to the side opposite to the base material layer 2 of the pressure-sensitive adhesive layer 3. The phase difference sheet 5 is an optical compensation sheet for improving the viewing angle characteristics of the display color and the display contrast of the liquid crystal cell, and it may be, for example, a ¼ wavelength sheet or a ½ wavelength sheet. A single layer product, or a laminate product, of uniaxially extended polymer film, or films, such as polycarbonate, polyarylate, polystyrene or polysulfone, for example, can be used for such a phase difference sheet 5.

The pressure-sensitive adhesive layer 6 is joined on the surface which is positioned on the opposite side to the pressure-sensitive adhesive layer 3 of the phase difference sheet 5. This pressure-sensitive adhesive layer 6 is formed from a single layer, and the material from which it is constructed may be the same as that cited for the layers 31 to 33 of the pressure-sensitive adhesive layer 3 described earlier.

Moreover, the pressure-sensitive adhesive layer 6 may be constructed with a laminate body of a plurality of layers, and in particular it may have a similar construction to the pressure-sensitive layer 3 described earlier.

A release sheet 4 as described earlier is stuck onto the surface which is positioned on the opposite side to the phase difference sheet 5 of the pressure-sensitive adhesive layer 6.

With the pressure-sensitive adhesive sheet 1C having the above-described construction, the layer 31 maintains its bonding strength with the base material layer 2 even if any contraction of the base material layer 2 occurs, thereby lifting and peeling are effectively prevented. Further, at the same time, the layer 32 and/or the layer 33 relieves (absorbs or disperses) the stress which is produced as the base material layer 2 contracts, so that local concentration of the residual stress can be prevented. Furthermore, as has been described above, in the case where the bonding strength between the layers 31, 32 and 33 is relatively weak, displacement (movement) at the boundary surfaces between adjoining layers occurs readily and thereby a stress-relieving action caused by such displacement is also exhibited. Hence, in a case where the pressure-sensitive adhesive sheet 1C is used by being stuck onto an STN liquid crystal cell, for example, the occurrence of the color unevenness is prevented or suppressed.

Moreover, in this invention, the pressure-sensitive adhesive layer may be constructed with a laminate body formed from four or more layers. In such a case, the first layer described above is on the side closest to the base material layer (and especially bonded to the base material layer), and at least one of the other layers should be a second layer as described above.

In each of the embodiments described above, a light-polarizing sheet has been used for the base material 2, but the invention is not limited thereto and it may be some other sheet-like optical parts, such as an analyzer, a phase difference element (¼ wavelength sheet, ½ wavelength sheet for example), a light-rotating element (a Faraday element or a spontaneous light-rotating element) or any of a variety of optical filters.

Furthermore, the pressure-sensitive adhesive sheets of this invention are not limited to those which are used by being stuck onto liquid crystal cells and those which are used in optical parts which are used in other applications. Namely, this invention can be preferably applied to pressure-sensitive adhesive sheets in which deformations such as expansion, contraction and warping and the like are liable to arise in a base material layer thereof in response to changes in the environmental conditions, such as temperature and humidity.

EXAMPLES

The invention is described in more detail below by means of practical examples.

Example 1

A pressure-sensitive adhesive layer was formed on one side of a light-polarizing sheet base material which forms a base material layer using a lamination method with coating and transfer, and then a release sheet was stuck onto the pressure-sensitive adhesive layer, to provide a pressure-sensitive adhesive sheet (dimensions: length 80 mm×width 150 mm) of this invention which has a construction as shown in FIG. 1. The structure of each layer in this case was as indicated below.

(1) Light-polarizing Sheet Base Material
Composition Material: Triple layer laminate comprising
triacetylcellulose film;
polyvinyl alcohol film; and
triacetylcellulose film
Thickness: 180 μm (2) Pressure-sensitive Adhesive Layer
Layer Structure: Double layer laminate
Method of Production: Transfer method (details below).
First Layer (Light-polarizing Sheet Base Material Side)
Trimethylolpropane tolylene diisocyanate (crosslinking agent) (0.1 part by weight) was mixed with 99.9 parts by weight of an acrylic acid ester-based polymer (pressure-sensitive adhesive) comprising 5 parts by weight acrylic acid in 95 parts by weight butyl acrylate, thereby a pressure-sensitive adhesive solution was prepared. Thus obtained solution was coated onto the same film as the release sheet described below and dried, and the film obtained was transferred onto one side of the light-polarizing sheet base material using the transfer method.

Second Layer (Release Sheet Side)
Di-2-ethylhexyl adipate (plasticizer) (5 parts by weight) was mixed with a pressure-sensitive adhesive solution of the same composition as for the aforementioned first layer (100 parts by weight as solid fraction) and a pressure-sensitive adhesive solution was prepared. Thus obtained solution was coated onto a similar film to that described earlier and dried, and the film so obtained was transferred onto the surface of the first layer by means of a transfer method.

Thus obtained double layer laminate was then aged for 1 week at normal temperature.

Conditions of Each Layer are shown in Table 1 attached to the Specification.

(3) The Release Sheet
Composition material: Polyester film, silicone treated on one side (SP PET38 manufactured by Lintec Corporation)
Thickness: 38 μm Example 2

A pressure-sensitive adhesive sheet was prepared in the same way as in Example 1 except that 6 parts by weight of di-2-ethylhexyl phthalate were used as the plasticizer added to the second layer of the pressure-sensitive adhesive layer in Example 1. The conditions of each layer from which the pressure-sensitive adhesive layer was constructed are shown in Table 1 attached to the specification.

Example 3

A pressure-sensitive adhesive sheet was prepared in the same way as in Example 1 except that 5 parts by weight of liquid polyether were used as the plasticizer and 0.08 parts by weight of crosslinking agent (of the same composition) were added to the second layer of the pressure-sensitive adhesive layer in Example 1. The conditions of each layer from which the pressure-sensitive adhesive layer was constructed are shown in Table 1.

Example 4

A pressure-sensitive adhesive sheet (of the structure shown in FIG. 2) was prepared in the same way as in Example 1 except that the pressure-sensitive adhesive layer was a triple layer laminate with a third layer of the same composition as the second layer formed in the same way on the surface of said second layer in Example 1. The conditions of each layer from which the pressure-sensitive adhesive layer was constructed are shown in Table 1.

Example 5

A pressure-sensitive adhesive sheet (of the structure shown in FIG. 2) was prepared in the same way as in Example 1 except that the pressure-sensitive adhesive layer was a triple layer laminate with a third layer of the same composition as the second layer in Example 2 formed in the same way on the surface of the second layer in Example 1. The conditions of each layer from which the pressure-sensitive adhesive layer was constructed are shown in Table 1.

Example 6

A pressure-sensitive adhesive sheet (of the structure shown in FIG. 2) was prepared in the same way as in Example 3 except that the pressure-sensitive adhesive layer was a triple layer laminate with a third layer in which 10 parts by weight of trioctyl trimellitate were used for the plasticizer added to the second layer composition formed in the same way on the surface of the second layer in Example 3. The conditions of each layer from which the pressure-sensitive adhesive layer was constructed are shown in Table 1 below.

Example 7

A pressure-sensitive adhesive sheet (of the structure shown in FIG. 2) was prepared in the same way as in Example 2 except that the pressure-sensitive adhesive layer was a triple layer laminate with a third layer of the same composition as the first layer formed in the same way on the surface of the second layer in Example 2. The conditions of each layer from which the pressure-sensitive adhesive layer was constructed are shown in Table 1.

Example 8

A pressure-sensitive adhesive sheet was manufactured in the same way as in Example 1 except that the second layer of the pressure-sensitive adhesive layer in Example 1 was formed in the way indicated below.

Second Layer
Trimethylolpropane tolylene diisocyanate (crosslinking agent) (0.05 parts by weight) was mixed with 99.95 parts by weight of an acrylic acid ester-based polymer (pressure-sensitive adhesive) comprising 5 parts by weight of acrylic acid in 95 parts by weight of 2-ethylhexyl acrylate and a pressure-sensitive adhesive solution was prepared. This solution was coated into the same type of film as before and dried, and the film obtained was transferred onto the surface of the first layer using the transfer method.

The conditions of each layer from which the pressure-sensitive layer was constructed were as shown in Table 1.

Example 9

A pressure-sensitive adhesive sheet (of the structure shown in FIG. 2) was prepared in the same way as in Example 4 except that the second and third layers of the pressure-sensitive adhesive layer in Example 4 were formed in the way indicated below.

Second Layer
Trimethylolpropane tolylene diisocyanate (crosslinking agent) (0.1 part by weight) was mixed with 99.9 parts by weight of an acrylic acid ester-based polymer (pressure-sensitive adhesive) comprising 5 parts by weight of acrylic acid in 95 parts by weight 2-ethylhexyl acrylate and a pressure-sensitive adhesive solution was prepared. This solution was coated into a film in the same way as before and dried, and the film obtained was transferred onto the surface of the first layer using the transfer method.

Third Layer

Di-2-ethylhexyl adipate (plasticizer) (5 parts by weight) was mixed with a pressure-sensitive adhesive solution (100 parts by weight solid fraction) of the same composition as for the second layer and the pressure-sensitive adhesive solution so prepared was coated onto a film in the same way as before and dried, and the film obtained was transferred onto the surface of the second layer using the transfer method.

The conditions of each layer from which the pressure-sensitive adhesive layer was constructed are shown in Table 1.

Example 10

A pressure-sensitive adhesive sheet (of the structure shown in FIG. 2) was prepared in the same way as in Example 1 except that the pressure-sensitive adhesive layer (triple layer laminate) was produced using the co-extrusion method. The composition etc. of each layer of the pressure-sensitive emulsion layer was as indicated below.

First Layer

Acrylic acid ester-based polymer (pressure-sensitive adhesive) comprising 5 parts by weight acrylic acid in 95 parts by weight butyl acrylate: 99.9 parts by weight.

Trimethylolpropane tolylene diisocyanate (crosslinking agent): 0.1 part by weight.

Degree of crosslinking of the first layer: Gel fraction 85%.

Second Layer

Silicone pressure-sensitive adhesive of the composition indicated below.

Dimethylpolysiloxane: 50 parts by weight

Silicone resin: 50 parts by weight

Benzoyl peroxide (BPO, polymerization initiator): 0.3 parts by weight

Third Layer

Same as the first layer.

The conditions of each layer from which the pressure-sensitive adhesive layer is constructed are shown in Table 1.

Comparative Example 1

A pressure-sensitive adhesive layer was formed using the coating method on one side of a light-polarizing sheet-based material which formed the base material layer and then a release sheet was stuck onto this pressure-sensitive adhesive layer and a pressure-sensitive adhesive sheet of the same dimensions as in Example 1 was produced. The structure of each layer was as indicated below.

(1) Light-polarizing Sheet Base Material Same as in Example 1.

(2) Pressure-sensitive Adhesive Layer

Layer Structure: Single layer structure

Method of Production: Transfer method (details as indicated below)

A pressure-sensitive adhesive solution of the same composition as for the first layer in Example 1 was prepared and this solution was coated onto one side of the light-polarizing sheet base material and dried, and a pressure-sensitive adhesive layer was formed. The conditions of each layer from which the pressure-sensitive adhesive layer was constructed are shown in Table 1.

(3) Release Sheet

Same as in Example 1.

Comparative Example 2

A pressure-sensitive adhesive sheet was prepared in the same way as in Comparative Example 1 except that the conditions of the pressure-sensitive adhesive layer were as indicated below.

Layer Structure: Single layer structure

Method of Production: Transfer method (details as indicated below).

Di-2-ethylhexyl adipate (plasticizer) (15 parts by weight) was mixed with a pressure-sensitive adhesive solution (solid fraction 100 parts by weight) of the same composition as the first layer in Example 1 and a pressure-sensitive adhesive solution was prepared. This solution was coated onto one side of the light-polarizing sheet base material and dried, and a pressure-sensitive adhesive layer was formed.

The conditions of each layer from which the pressure-sensitive adhesive layer was constructed are shown in Table 1.

Test 1

The release sheets were removed from the pressure-sensitive adhesive sheets obtained in the above-mentioned Examples 1 to 10 and Comparative Examples 1 and 2, and the pressure-sensitive adhesive sheets were stuck with the exposed pressure-sensitive adhesive layers onto both sides of a glass sheet for liquid crystal cell in such a way as to form crossed Nicols. The samples so obtained were introduced into environmental conditions of 80° C., dry, for 1000 hours (First Conditions) and environmental conditions of 60° C.×90% RH for 1000 hours (Second Conditions) and the state of occurrence of the white marking (change in transmittance) was assessed visually.

The results of this test are shown in Table 2 attached to the specification.

The assessment standards used in Table 2 were as follows:

⊚: No white marking is observed at all.

○: Any white marking is barely observed.

Δ: Some white marking is observed.

×: Quite a lot of white marking is observed.

××: Pronounced white marking is generated.

As is clear from the results shown in Table 2, it is confirmed that when the pressure-sensitive adhesive sheets (adhesive light-polarizing sheets) of this invention from Examples 1 to 10 are used by being stuck onto a liquid crystal cell, the level of white marking is suppressed.

On the other hand, with the pressure-sensitive adhesive sheet of Comparative Example 1 there was pronounced white marking, and with the pressure-sensitive adhesive sheet of Comparative Example 2 the pressure-sensitive adhesive layer peeled off from the light-polarizing sheet base material and it could not be used in practice.

Examples 1' to 10' and Comparative Example 1'

The other side of a phase difference sheet (¼ wavelength sheet) which had a second pressure-sensitive adhesive layer and a release sheet on one side was stuck onto the pressure-sensitive adhesive layers of the pressure-sensitive adhesive sheets obtained in the above-mentioned Examples 1 to 10 and in Comparative Example 1, and pressure-sensitive adhesive sheets which were constructed as a whole with an elliptical polarizing sheet (Examples 1' to 10' and Comparative Example 1' corresponding to Examples 1 to 10 and Comparative Example 1) were prepared.

In these cases, the structures of the phase difference sheet and the second pressure-sensitive adhesive layer were as indicated below.

(4) Phase Difference Sheet

Composition material: Polycarbonate film (single layer)

Thickness: 60 μm (5) Second Pressure-sensitive Adhesive Layer

Layer Structure: Single layer structure

Method of Production: Transfer method (details as indicated below).

A pressure-sensitive adhesive solution of the same composition as the first layer in Example 1 was prepared and this solution was coated onto one side of the phase difference sheet and dried, and the second pressure-sensitive adhesive layer (dry film thickness 30 μm) was formed.

Test 2

The release sheets were removed from the pressure-sensitive adhesive sheets of the above-mentioned Examples 1' to 10' and Comparative Examples 1' and stuck with the exposed second pressure-sensitive adhesive layers onto both sides of a glass sheet for liquid crystal cell purposes in such a way as to form crossed Nicols. The samples so obtained were left to stand under the aforementioned first conditions and second conditions and the occurrence of color unevenness was assessed visually.

The results are shown in Table 3 attached to the specification.

Moreover, the assessment standards used in Table 3 were as follows:

⊚: No color unevenness is seen at all.

○: Any color unevenness is barely seen.

Δ: Some color unevenness is observed.

x: Quite a lot of color unevenness is observed.

As is clear from the results shown in Table 3, it is confirmed that when the pressure-sensitive adhesive sheets (pressure-sensitive adhesive light-polarizing sheets) of this invention from Examples 1' to 10' are used by being stuck onto a liquid crystal cell, the occurrence of color unevenness can be suppressed.

On the other hand, there was pronounced color unevenness with the pressure-sensitive adhesive sheet of Comparative Example 1'.

Effect of the Invention

As has been described above, with the pressure-sensitive adhesive sheets of this invention there is no lifting or peeling of the pressure-sensitive adhesive layer with respect to the base material layer, the stress which is produce by contraction of the base material layer is relieved by the pressure-sensitive adhesive layer and thereby the local stress concentration at the edges of the sheet can be reduced.

Consequently, this has the effect of suppressing the phenomena which are produced by the stress distribution in the base material layer for example becoming uneven, such as the white marking with TN (TFT) liquid crystal cells and the color unevenness with STN liquid crystal cells for example.

Furthermore, with the pressure-sensitive adhesive sheets of this invention the pressure-sensitive adhesive layer can be manufactured with a lamination method by transfer or by co-extrusion, for example, and production is simple.

Finally, it should be noted that the present invention is no way limited to the embodiments described above. The scope of the present invention is determined only by the following claims.

What is claimed is:

1. A pressure-sensitive adhesive sheet to be used for a liquid crystal cell of a liquid crystal display, comprising:

a. a base material layer formed into a light polarizing sheet or a phase difference sheet used in the liquid crystal display; and b. a pressure-sensitive adhesive layer for sticking said base material layer onto the liquid crystal cell of the liquid crystal device, said pressure-sensitive adhesive layer being constructed with a laminate body of a plurality of layers which include a first layer which is closest to the base material layer and a second layer positioned at a position closer to the liquid crystal cell than the first layer, wherein ratio of the shear elastic modulus of the second layer with respect to the shear elastic modulus of the first layer is from 5 to 99%, whereby stress which would be produced by contraction of said base material layer is relieved by the pressure-sensitive adhesive layer to prevent color unevenness or white marking from appearing on the liquid crystal display.

2. The pressure-sensitive adhesive sheet as claimed in claim 1, wherein the light polarizing sheet includes two triacetylcellulose films and a PVA-based polarizer inserted between the films.

3. The pressure-sensitive adhesive sheet as claimed in claim 1, wherein the phase difference sheet is formed from a single layer or a plurality layers of uniaxially extended polymer film formed of a material selected from the group comprising polycarbonate, polyarylate, polystyrene and polysulfone.

4. The pressure-sensitive adhesive sheet as claimed in claim 1, wherein the pressure-sensitive adhesive composition in the first layer and the pressure-sensitive adhesive composition in the second layer are different.

5. The pressure-sensitive adhesive sheet as claimed in claim 1, wherein the base material layer and the first layer are tightly bonded, and the first layer has a shear elastic modulus of such an extent that neither cohesive failure nor boundary surface failure occur as the result of the action of the shear stress which accompanies contraction of the base material layer.

6. The pressure-sensitive adhesive sheet as claimed in claim 1, wherein the first layer and the second layer are tightly bonded, and the bonding strength thereof is of an extent which slightly exceeds the bonding strength between the liquid crystal cell and the pressure sensitive adhesive layer.

7. The pressure-sensitive adhesive sheet as claimed in claim 1, wherein the thickness of the second layer is of the order of from 1 to 15 times the thickness of the first layer.

8. The pressure-sensitive adhesive sheet as claimed in claim 1, wherein the pressure-sensitive adhesive layer is formed by means of a lamination method with transfer.

9. A pressure-sensitive adhesive sheet to be used for a liquid crystal cell of a liquid crystal display, comprising:

a. a base material layer formed into a light polarizing sheet or a phase difference sheet used in the liquid crystal display;

b. a pressure-sensitive adhesive layer for sticking said base material layer onto the liquid crystal cell of the liquid crystal device, said pressure-sensitive adhesive layer being constructed with a laminate body of a plurality of layers which include a first layer which is closest to the aforementioned base material layer and a second layer, which is to be positioned at a position closer to the liquid crystal cell than said first layer when used, wherein the ratio of the relaxation elastic modulus of the aforementioned second layer with respect to the relaxation elastic modulus of the aforementioned first layer is from 1 to 99%, whereby stress which would be produced by contraction of said base material layer is relieved by the pressure-sensitive adhesive layer to prevent color unevenness or white marking from appearing on the liquid crystal display.

10. The pressure-sensitive adhesive sheet as claimed in claim 9, wherein the light polarizing sheet includes two triacetylcellulose films and a PVA-based polarizer inserted between the films.

11. The pressure-sensitive adhesive sheet as claimed in claim 9, wherein the phase difference sheet is formed from a single layer or a plurality layers of uniaxially extended polymer film formed of a material selected from the group comprising polycarbonate, polyarylate, polystyrene and polysulfone.

12. The pressure-sensitive adhesive sheet as claimed in claim 9, wherein the relaxation elastic modulus G(100) after 100 seconds of the first layer is from $2.0 \times 10^5$ to $5.0 \times 10^6$ (dyn/cm$^2$) and the relaxation elastic modulus G(100) after 100 seconds of the aforementioned second layer is from $7.0 \times 10^4$ to $2.0 \times 10^6$ (dyn/cm$^2$).

13. The pressure-sensitive adhesive sheet as claimed in claim 9, wherein the pressure-sensitive adhesive composition in the first layer and the pressure-sensitive adhesive composition in the second layer are different.

14. The pressure-sensitive adhesive sheet as claimed in claim 9, wherein the base material layer and the first layer are tightly bonded, and the first layer has a shear elastic modulus of such an extent that neither cohesive failure nor boundary surface failure occur as the result of the action of the shear stress which accompanies contraction of the base material layer.

15. The pressure-sensitive adhesive sheet as claimed in claim 9, wherein the first layer and the second layer are tightly bonded, and the bonding strength thereof is of an extent which slightly exceeds the bonding strength between the liquid crystal cell and the pressure sensitive adhesive layer.

16. The pressure-sensitive adhesive sheet as claimed in claim 9, wherein the thickness of the second layer is of the order of from 1 to 15 times the thickness of the first layer.

17. The pressure-sensitive adhesive sheet as claimed in claim 9, wherein the pressure-sensitive adhesive layer is formed by means of a lamination method with transfer.

18. A pressure-sensitive adhesive sheet to be used for a liquid crystal cell of a liquid crystal display, comprising:
 a. a base material layer formed into a light polarizing sheet or a phase difference sheet used in the liquid crystal display; and
 b. a pressure-sensitive adhesive layer for sticking said base material layer onto the liquid crystal cell of the liquid crystal device, said pressure-sensitive adhesive layer being constructed with a laminate body of a plurality of layers which include a first layer which is closest to the aforementioned base material layer and a second layer positioned at a position closer to the liquid crystal cell than said first layer, wherein plasticizer is added to the composition material of the second layer, in which the amount of plasticizer added to the composition material of the second layer is from 0.1 to 50 parts by weight per 100 parts by weight of the adhesive, whereby stress which would be produced by contraction of said base material layer is relieved by the pressure-sensitive adhesive layer to prevent color unevenness or white marking from appearing on the liquid crystal display.

19. The pressure-sensitive adhesive sheet as claimed in claim 18, wherein the light polarizing sheet includes two triacetylcellulose films and a PVA-based polarizer inserted between the films.

20. The pressure-sensitive adhesive sheet as claimed in claim 18, wherein the phase difference sheet is formed from a single layer or a plurality layers of uniaxially extended polymer film formed of a material selected from the group comprising polycarbonate, polyarylate, polystyrene and polysulfone.

21. The pressure-sensitive adhesive sheet as claimed in claim 18, wherein the pressure-sensitive adhesive composition in the first layer and the pressure-sensitive adhesive composition in the second layer are different.

22. The pressure-sensitive adhesive sheet as claimed in claim 18, wherein the base material layer and the first layer are tightly bonded, and the first layer has a shear elastic modulus of such an extent that neither cohesive failure nor boundary surface failure occur as the result of the action of the shear stress which accompanies contraction of the base material layer.

23. The pressure-sensitive adhesive sheet as claimed in claim 18, wherein the first layer and the second layer are tightly bonded, and the bonding strength thereof is of an extent which slightly exceeds the bonding strength between the liquid crystal cell and the pressure-sensitive adhesive layer.

24. The pressure-sensitive adhesive sheet as claimed in claim 18, wherein the thickness of the second layer is of the order of from 1 to 15 times the thickness of the first layer.

25. The pressure-sensitive adhesive sheet as claimed in claim 18, wherein the pressure-sensitive adhesive layer is formed by means of a lamination method with transfer.

26. A pressure-sensitive adhesive sheet to be used for a liquid crystal cell of a liquid crystal display, comprising:
 a. a base material layer formed into a light polarizing sheet or a phase difference sheet used in the liquid crystal display; and
 b. a pressure-sensitive adhesive layer for sticking said base material layer onto the liquid crystal cell of the liquid crystal device, said pressure-sensitive adhesive layer being constructed with a laminate body of a plurality of layers which include a first layer which is closest to the aforementioned base material layer and a second layer positioned at a position closer to the liquid crystal cell than the first layer, wherein the degree of crosslinking of the polymeric material from which the second layer is constructed is low in comparison with the degree of crosslinking of the polymeric material from which the first layer is constructed, whereby stress which would be produced by contraction of said base material layer is relieved by the pressure-sensitive adhesive layer to prevent color unevenness or white marking from appearing on the liquid crystal display.

27. The pressure-sensitive adhesive sheet as claimed in claim 26, wherein the light polarizing sheet includes two triacetylcellulose films and a PVA-based polarizer inserted between the films.

28. The pressure-sensitive adhesive sheet as claimed in claim 26, wherein the phase difference sheet is formed from a single layer or a plurality layers of uniaxially extended polymer film formed of a material selected from the group comprising polycarbonate, polyacrylate, polystyrene and polysulfone.

29. The pressure-sensitive adhesive sheet as claimed in claim 26, wherein the pressure-sensitive adhesive composition in the first layer and the pressure-sensitive adhesive composition in the second layer are different.

30. The pressure-sensitive adhesive sheet as claimed in claim 26, wherein the base material layer and the first layer are tightly bonded, and the first layer has a shear elastic modulus of such an extent that neither cohesive failure nor boundary surface failure occur as the result of the action of the shear stress which accompanies contraction of the base material layer.

31. The pressure-sensitive adhesive sheet as claimed in claim 26, wherein the first layer and the second layer are tightly bonded, and the bonding strength thereof is of an extent which slightly exceeds the bonding strength between the liquid crystal cell and the pressure-sensitive adhesive layer.

32. The pressure-sensitive adhesive sheet as claimed in claim 26, wherein the thickness of the second layer is of the order of from 1 to 15 times the thickness of the first layer.

33. The pressure-sensitive adhesive sheet as claimed in claim 26, wherein the pressure-sensitive adhesive layer is formed by means of a lamination method with transfer.

* * * * *

UNITED STATES PATENT AND TRADEMARK OFFICE
CERTIFICATE OF CORRECTION

PATENT NO. : 6,074,729
DATED : June 13, 2000
INVENTOR(S) : Shunpei Watanabe et al.

It is certified that error appears in the above-identified patent and that said Letters Patent is hereby corrected as shown below:

Title page,
Column 2,
Line 16, under "ABSTRACT", change "1" to -- 31 --.

Claim 3,
Line 3, change "plurality layers" to -- plurality of layers --.

Claim 11,
Line 3, change "plurality layers" to -- plurality of layers --.

Claim 20,
Line 3, change "plurality layers" to -- plurality of layers --.

Claim 28,
Line 3, change "plurality layers" to -- plurality of layers --.
Line 5, change "polyacrylate, " to -- polyarylate, --.

Signed and Sealed this

Sixteenth Day of October, 2001

Attest:

NICHOLAS P. GODICI
Attesting Officer   Acting Director of the United States Patent and Trademark Office